United States Patent
Meddeler (10) Patent No.: US 9,609,246 B2
(45) Date of Patent: *Mar. 28, 2017

(54) DATA THROTTLING TO FACILITATE FULL FRAME READOUT OF AN OPTICAL SENSOR FOR WAFER TESTING

(71) Applicant: AltaSens, Inc., Westlake Village, CA (US)

(72) Inventor: Gerrit J. Meddeler, Los Angeles, CA (US)

(73) Assignee: AltaSens, Inc, Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,835

(22) Filed: May 13, 2015

(65) Prior Publication Data

US 2015/0244961 A1    Aug. 27, 2015

Related U.S. Application Data

(63) Continuation of application No. 13/719,851, filed on Dec. 19, 2012, now Pat. No. 9,049,422.

(51) Int. Cl.
*H04N 5/372* (2011.01)
*H04N 17/00* (2006.01)
*H04N 5/378* (2011.01)

(52) U.S. Cl.
CPC ......... *H04N 5/37206* (2013.01); *H04N 5/378* (2013.01); *H04N 17/002* (2013.01)

(58) Field of Classification Search
CPC ........ H04N 17/002; H04N 9/045; H04N 5/76; H04N 2101/00; H04N 2201/001; G06T 7/0018

USPC ................................ 348/187, 207.99, 222.1
See application file for complete search history.

(56) References Cited

U.S. PATENT DOCUMENTS

| | | | |
|---|---|---|---|
| 6,721,008 B2 | 4/2004 | Lee et al. | |
| 7,335,026 B2 | 2/2008 | Goree et al. | |
| 2012/0268636 A1 | 10/2012 | Mabuchi | |
| 2013/0007185 A1* | 1/2013 | McFadzean | H04N 21/2393 709/213 |

OTHER PUBLICATIONS

Non-Final Office Action for U.S. Appl. No. 13/719,851 dated Aug. 15, 2014, 18 pages.

* cited by examiner

*Primary Examiner* — Yogesh Aggarwal
(74) *Attorney, Agent, or Firm* — Amin, Turocy & Watson LLP (57) ABSTRACT

Providing for operation of high-speed optical sensor equipment at full data path speeds in conjunction with testing equipment operating at a lower speed is described herein. By way of example, a data stream output from optical sensor equipment to testing equipment can be throttled at a serial interface between such equipment. Throttling can involve subdividing a set of pixel data and outputting a subset of the pixel data in a given readout frame. Consecutive outputs of respective subsets of pixel data are initiated with an offset from the previous readout frame. Accordingly, the optical sensor equipment can be operated at full speeds, simulating realistic operational conditions, while slower testing equipment can be utilized to perform data analytics, heuristics, and other quality tests on various portions of the optical sensor equipment.

20 Claims, 9 Drawing Sheets

FIG. 9

DATA THROTTLING TO FACILITATE FULL FRAME READOUT OF AN OPTICAL SENSOR FOR WAFER TESTING

CROSS-REFERENCE TO RELATED APPLICATIONS

This application is a Continuation of application Ser. No. 13/719,851 filed on Dec. 19, 2012, the entire contents of which are incorporated herein by reference.

TECHNICAL FIELD

The subject disclosure relates generally for data readout from an optical image sensor and more particularly to full frame readout of high data speed image sensors during wafer testing.

BACKGROUND

Electronic cameras, video cameras, and related image capture devices have become popular in recent years as prices steadily drop and miniaturization facilitates incorporating such devices in small hand-held electronics. This is at least in part due to the rapid advancements in electronics technology, reducing the cost of these devices and greatly enhancing their technical features. The combination of drastically reduced cost and greatly increased utility has driven consumer demand to unparalleled levels, making these devices very common among the general consumer population.

Multiple technological advancements have specifically facilitated integration of image capture components into consumer electronics. First, improvements in semiconductor technology enable processor and memory chips to become increasingly smaller for a given number of transistors. Ongoing research and development in transistor miniaturization have enabled electronics to shrink in size generally, including consumer electronics and related optical electronic components. Second, miniaturization of optical components including lenses and image sensors has enabled fabrication of these components at a fraction of their volume just a decade ago. While large optical lenses have traditionally been a constraint on the size of video capture devices, this is decreasingly the case, particularly with fixed focus optical devices. Third, digitization of image capture and storage technology has enabled a transition away from film media and toward digital storage media. Modern digital storage media, such as a micro flash chip, can hold many thousands of pictures, feature-length video, and more, on a small flat memory chip that can be plugged into a cell phone, or other hand-held electronic device.

While there has been great technological advancement in optical devices generally, image capture and image processing have observed very profound advancements in particular. For instance, digitization of image capture technology has facilitated great advancements in camera and video recording electronics. Digital image sensors generally comprise a two-dimensional grid of light-sensitive electronic pixels, which can detect varying levels of light energy, varying wavelengths of light, and other optical characteristics. Light incident upon a digital image sensor can be captured by the grid of pixels and, because respective pixels are sensitive to variations in light energy and wavelength, spatial variations in brightness, contrast and even color over the two-dimensional grid can be captured. When coupled with a suitably positioned optical lens, the incident light can form an image that is projected onto and captured by the digital image sensor. The sensor can then output image data for storage, data processing, image processing, or the like.

High speed image processing involves sophisticated hardware, including processors and memory, as well as higher clock speeds. These characteristics extend to the image sensor, which captures and outputs image information at a rate at least equal to the video frame rate, as well as the image processing electronics, which convert the output image information into a usable form for graphical display at similar rates. A general characteristic of modern electronics is that faster signal processing, particularly analog signal processing, consumes more electrical power. In addition, as image capture devices transition to high definition imaging, the graphical resolutions increase greatly. Increased resolution involves the capture and processing of more information than low resolution systems, further increasing power consumption. Digital electronics, on the other hand, can often reduce power consumption and increase processing speeds, providing advantages over analog devices for various applications.

Technological advancements in high-speed image processing equipment are generally coordinated to meet evolving consumer demand in the consumer electronics industry. Although innovation is typically directed to providing new technology, including software applications, device processing speed, memory capabilities, and the like, little leeway is given for reduction in quality. Yet high turnover in new designs has shown to impact quality control. Testing equipment and related processes are often designed to mitigate the impact to device quality that can result from an intense focus on new product innovation. For instance, suitable testing equipment can help to identify problems in design, manufacture, and other segments of production, and can be a significant part of quality control for electronic devices in general, and opto-electronic devices in particular. Quality control therefore fills a significant role in meeting consumer demand and satisfying consumer expectation.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

Aspects of the subject disclosure provide for interfacing high-speed optical sensor equipment with lower speed testing equipment while operating pixel readout and data path functionality of the optical sensor equipment at full speeds. In particular aspects, a data stream output from the optical sensor equipment to the testing equipment can be throttled at a serial interface between such equipment. Throttling can comprise subdividing a set of pixel data and outputting a subset of the pixel data in a given readout frame. Consecutive outputs of respective subsets of pixel data are initiated with an offset from the previous readout frame, until each subset of the set of pixel data is read out from the optical sensor equipment. In this manner, the optical sensor equipment can be operated at full speeds, simulating realistic operational conditions, while slower testing equipment can be utilized to perform data analytics, heuristics, and other quality tests on various portions of the optical sensor equipment. As a result, testing and quality analysis functions for high-speed sensor equipment need not be hindered by lack of testing equipment that operates at similar speeds. This can facilitate a greater focus of design and development resources on an end product, while mitigating expenditures on peripheral equipment to support the end product.

In further aspects, the subject disclosure provides a system for data readout from an electronic image sensor. The system can comprise a serial data interface for receiving a set of bits from a pixel array of the electronic image sensor and converting the set of bits into a sequential stream of bits. The system can further comprise a throttling component that receives the sequential stream of bits, outputs a subset of the bits and discards a second subset of the stream of bits in a first data output frame.

In one or more other aspects, provided is a method of reading data from an optical image sensor. The method can comprise receiving data output by a pixel array of the optical image sensor at an input to a serial data converter at an input data rate, and serializing the data into a data stream. Moreover, the method can comprise reducing a speed of the data stream to an output data rate that is a fraction of the input data rate and is proportional to a processing characteristic of a testing hardware. In addition to the foregoing, the method can comprise outputting the data stream from the serial data converter to the testing hardware at the output data rate.

According to further aspects of the subject disclosure, provided is an apparatus that tests operation of an image sensor. The apparatus can comprise a serial interface for receiving data from the image sensor and converting the data to serial data. The apparatus can also comprise a testing circuit configured to implement a set of data analytics for the serial data. Furthermore, the apparatus can comprise a speed matching component configured to determine a ratio of processing speed of the testing circuit and data speed of an output data path of the image sensor. In addition, the apparatus can comprise a throttling component configured to reduce an output speed of the serial data from the serial interface by about the ratio of processing speed and data speed.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

As utilized herein, terms "component," "system," and the like are intended to refer to an electronic or computing entity, either hardware, software (e.g., in execution), or firmware. For example, a component can be one or more semiconductor transistors, an arrangement of semiconductor transistors, a circuit, data transfer or integration circuitry, an electronic clock, a process running on a processor, a processor, an object, a state machine, a computer, etc. By way of illustration, a circuit, a transistor array electrically connected with the circuit, or a controller that manages data flow between the transistor array and the circuit can be a component. Furthermore, an apparatus can comprise one or more components that operate together as a system. For instance, the apparatus can comprise an arrangement of electronic hardware, data transfer circuits, logical control circuits, memory circuits that store processing instructions, and a processing circuit that implements the processing instructions in a manner suitable to perform an electronic or computing task.

Furthermore, various aspects of the disclosed subject matter can be implemented as a method, apparatus, or article of manufacture using typical manufacturing, programming or engineering techniques to produce hardware, firmware, software, or any suitable combination thereof to control an electronic device to implement one or more of the disclosed aspects. The term "article of manufacture" as used herein is intended to encompass an electronic device, a semiconductor device, a computer, or a computer program accessible from any computer-readable device, carrier, or media. By way of example, and not limitation, computer-readable media can include hardware media, or software media. In addition, the media can include storage media, transport media or communication media. For example, computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include a data transfer bus, a signal interface (e.g., a wireless communication interface), or the like. Of course, those skilled in the art will recognize many modifications can be made to this configuration without departing from the scope or spirit of the disclosed subject matter.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Various aspects of the subject disclosure provide for low power, high resolution analog to digital conversion. In particular aspects, the analog to digital conversion can be utilized in conjunction with an optical sensor array and digital electronic camera, although the scope of the subject disclosure is not limited to these aspects.

As demand for high definition video increases, electronic circuitry capable of capturing and processing higher digital resolutions is also required. Generally, high resolution video and imaging functionality involves processing much higher quantities of data as compared with lower resolution devices. Processing more information while maintaining overall frame rates typically involves higher clock speeds, and higher power consumption. High-speed processors can pose significant difficulties during testing and analysis, such as a wafer probe test, or the like. In many cases, a high-speed serial data interface poses severe problems when reading out full frame data during such a test. For instance, non-ideal impedance matching of differential data paths (e.g., an output data path of a high-speed processor, and an input data path for the wafer probe test), results in reduction of reliable data sampling for testing. Accordingly, a mechanism for testing high-speed equipment at full operating speeds, with lower speed testing equipment would provide a significant advantage for control and quality testing of optical sensor equipment. Particularly, design and development resources could be focused on high functionality sensor equipment, while mitigating resources diverted to keeping testing equipment up to pace with the sensor equipment.

Figure 1:
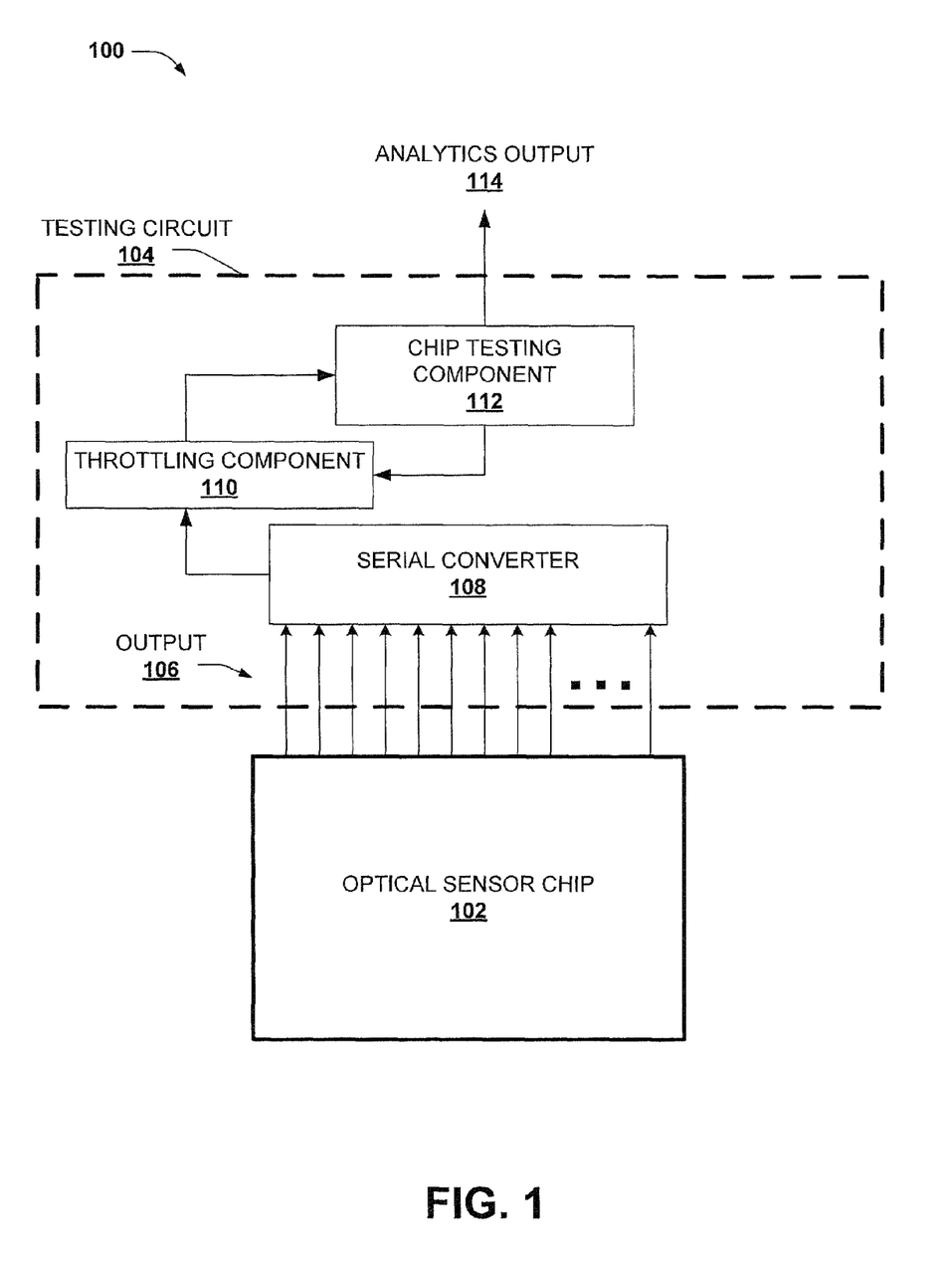
FIG. 1 illustrates a block diagram of an example system that facilitates testing high speed optical sensor chips with lower speed equipment.

Referring now to the drawings, FIG. 1 illustrates a block diagram of an example system 100 for integrating low-speed testing equipment with high-speed optical sensor equipment, according to one or more aspects of the subject disclosure. System 100 can comprise an optical sensor chip 102 communicatively connected to a testing circuit 104. Optical sensor chip 102 can comprise one of a variety of suitable digital electronic devices comprising a receiver sensitive to electromagnetic energy and configured to capture information pertaining to electromagnetic energy incident upon the receiver. In addition, optical sensor chip 102 can be configured to output data related to the captured electromagnetic energy information. Data related to the captured electromagnetic energy information can include color information, brightness information, contrast information, and so on. In addition, the data can comprise a set of digital information representing a corresponding set of discrete electromagnetic energy information captured at discrete sensors on a multi-dimensional region of optical sensor chip 102. This set of digital information, taken as a whole, can comprise the data related to the captured electromagnetic energy information, and subsets of the set of digital information can comprise suitable subsets of the data (e.g., a color-related subset of data, a brightness-related subset of data, a contrast-related subset of data, a spatial-related subset of data, and so on). In at least one aspect of the subject disclosure, optical sensor chip 102 can be a component of a camera, a camcorder, a video system, a microscope or telescope, or the like.

Optical sensor chip 102 can be communicatively connected to testing circuit 104 via an output bus 106. Output bus 106 can comprise any suitable data bus structure configured to concurrently transfer a plurality of discrete data units from an input of output bus 106 to an output of output bus 106. For instance, output bus 106 can concurrently transfer at least one discrete data unit per signal path of a set of signal paths of output bus 106. Thus, as an example, output bus 106 can transfer a set of discrete data units over respective subsets of the set of signal paths for a given data transfer period (e.g., a clock pulse).

A set of data output by optical sensor chip 102 can be received as an input at serial converter 108 of testing circuit 104. Serial converter 108 can be configured to serialize the set of data received as the input thereto. Particularly, the set of data received over respective subsets of the set of signal paths that comprise output bus 106 in a given time period can be converted into a stream of sequential data units. The sequential data units can be sequenced without particular order relative to the set of signal paths, or with a particular order (e.g., in a sequence derived from respective column numbers of a sensor array of optical sensor chip 102). Moreover, the stream of sequential data units can be buffered (e.g., stored), processed, or output by serial converter. In at least one aspect of the subject disclosure, the stream of sequential data units can be buffered and processed in a manner that slows down a rate of output of the stream of sequential data units to serial converter 108, as compared with a rate of input of the corresponding set of discrete data units into serial converter 108 (e.g., see FIGS. 3 and 4, infra). In another aspect of the subject disclosure, the stream of sequential data units can be output from serial converter 108 and processed in the manner to slow down the rate of the stream of sequential data units by a throttling component 110.

Throttling component 110 can be configured to receive a sequential stream of bits from serial converter 108. In response to receiving the sequential stream of bits, throttling component 110 can be configured to divide the stream of bits into a plurality of subsets of the stream of bits. The plurality of subsets of the stream of bits can be output from throttling component 110 to a chip testing component 112 individually and in sequence. Moreover, respective subsets of the stream of bits can be output by throttling component 110 in respective data transfer periods of output bus 106. These data transfer periods can be referred to as a data frame, transfer frame, clock pulse, or the like, and generally refer to a periodic time over which a set of data is output by optical sensor chip 102 to serial converter 108, and a subset of a previous set of data output by optical sensor chip 102 in a previous data transfer period, is output by throttling component 110 to chip testing component 112.

Chip testing component 112 can perform data analytical functions on the data output by throttling component 110. The data analytical functions can comprise analysis of quality or functionality of optical sensor chip 102. The data analytical functions can comprise heuristic functions, speed functions, data consistency functions, or the like, or suitable combinations thereof. Results of the data analytical functions can be output as analytics output 114 from testing circuit 104. Notably, chip testing component 112 can operate the data analytical functions at a lower speed than a data transfer speed of optical sensor chip 102. In this arrangement depicted by system 100, testing circuit 104 operating at, for instance 75 megahertz, can test functionality of optical sensor chip 102 operating at 600 megahertz, for instance.

As an illustrative example, in time t optical sensor chip 102 outputs a first set of parallel data, parallel$_1$, which is serialized into a first stream of serial data, serial$_1$, by serial converter 108. At time t+1, throttling component 110 can receive and subdivide the data of serial$_1$ into subsets thereof, such as serial$_{11}$, serial$_{12}$, and serial$_{13}$ (though the subject disclosure is not limited to three subsets), and output a first subset of the data, e.g., serial$_{11}$. At time t+2 throttling component 110 can output a second subset of the stream of data, serial$_{12}$, and at time t+3 throttling component 110 can output a third subset of the stream of data$_{13}$. Meanwhile, a second set of parallel data (e.g., parallel$_2$) can be output by optical sensor chip 102 and serialized into a second stream of data (e.g., serial$_2$) by serial converter 108 in time t+2, and a third set of parallel data (e.g., parallel$_3$) can be output by optical sensor chip 102 and serialized into a third stream of data (e.g., serial$_3$) in time t+3. In this example, throttling component 110 outputs three subsets of the serial$_1$ by time t+3, whereas optical sensor chip 102 outputs three sets of parallel data converted into respective serial streams of data. Thus, while optical sensor chip 102 operates at one data speed, testing circuit 104 can operate at a second, lower data speed by operation of serial converter 108 and throttling component 110, as described herein.

As described, system 100 can facilitate interoperability of an optical sensor and sensor testing equipment that operate at differing speeds. This can be useful as high demand exists for increasing processing capabilities of optical sensors for consumer electronics, but not as high of a demand for increased capabilities for testing equipment for quality control and related analytics of these optical sensors. Accordingly, as optical sensor technology advances, testing equipment often lags behind. System 100 can facilitate interoperability of such equipment, particularly where an optical sensor has higher data speed than a data speed capacity of testing equipment. Accordingly, existing testing equipment can be employed for newer technology optical sensors, improving longevity and pertinence of testing equipment, and reducing the amount of resources diverted to produce new testing equipment for rapidly changing iterations of consumer device technology.

Figure 2:
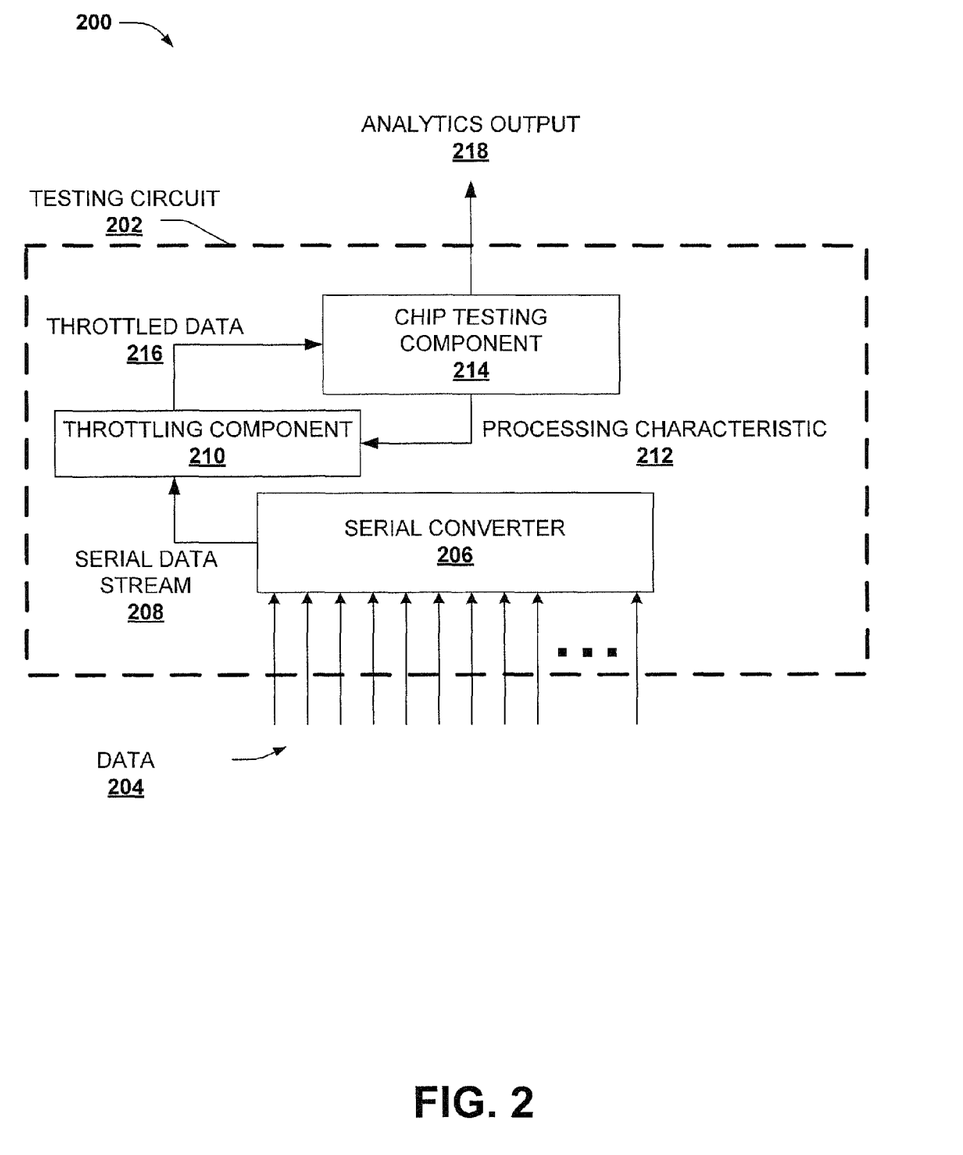
FIG. 2 depicts a block diagram of a sample system for throttling back data output from a data path while operating the data path at full speed.

FIG. 2 illustrates a block diagram of a sample system 200 comprising a testing circuit 202, according to further aspects of the subject disclosure. Testing circuit 202 can be configured for performing analytical functions on optical sensors according to further aspects of the subject disclosure. In particular aspects, testing circuit 202 can be configured to modify a data speed of incoming data, to provide interoperability between testing equipment and an optical sensor or differing data speeds, differing processing speeds, or the like.

System 200 includes a data input 204 that can be configured to transfer data to testing circuit 202 at periodic intervals, also referred to as data transfer frames, transfer frames, clock pulses, or the like. Data input 204 can provide a set of data for concurrent input to testing circuit 202 within a given data transfer frame. Successive iterations of parallel data can be transferred over data input 204 in corresponding successive data transfer frames.

It should be appreciated that data input 204 can also be data that is output by an optical sensor comprising an optical pixel array (not depicted, but see FIG. 3, infra), where the optical pixel array is comprised of a multi-dimensional matrix of pixels, for instance having a number of columns of optical pixel receptors and a number of rows of optical pixel receptors. In at least one aspect, data input 204 can comprise a concurrent output of at least a subset of the columns of optical pixel receptors. In another aspect, data input 204 can comprise a concurrent output of at least a subset of the rows of optical pixel receptors. In other aspects, other similar outputs can be implemented, or a suitable combination thereof.

A serial converter 206 can receive data input 204 and serialize the data into a serial data stream 208. Serial data stream 208 can be buffered at serial converter 206, in at least one aspect of the subject disclosure. For instance, where data input 204 operates at a higher data rate than testing circuit 202, a net increase in data will be input into testing circuit 202 as output by testing circuit 202 (assuming, e.g., input data is not being discarded in a ratio suitable to balance the output data with the input data). Accumulated input data can therefore be buffered or queued (or, in at least one aspect, a subset of the data can be discarded) by serial converter 206 (or by throttling component 210, or by a separate data buffer—not depicted) and held in queue for processing by testing circuit 202.

Serial data stream 208 can be output to throttling component 210 when throttling component 210 is finished outputting a prior set of serial data. Alternatively, serial data stream 208 can be output to throttling component 210 when a data buffer (not depicted) of throttling component 210 has sufficient available storage.

Throttling component 210 can be configured to receive a processing characteristic 212 of a chip testing component 214. Utilizing the processing characteristic, throttling component 210 can be configured to determine a factor with which to reduce the input data rate received at parallel data input 204, for output to chip testing component 214. A serial data stream at a reduced data rate, and output by throttling component 210, is depicted as throttled data 216. In some disclosed aspects, the factor can be a ratio of the input data rate and processing characteristic 212 of chip testing component 214, or some other suitable ratio (e.g., modified to account for discarded data). Serial data stream 206 can be subdivided into a number of subsets that is a function of the ratio, and one subset of serial data stream 206 can be output per data transfer frame of system 200.

By subdividing and outputting respective subsets of serial data stream 208 per data transfer frame, throttling component can slow down the transfer of data from data input 204 to chip testing component 214 as a function of the ratio. Accordingly, data input 204 can operate at a speed greater than testing circuit 202, enabling advanced higher speed optical sensors to be tested at full operating data path speed or full pixel readout speed by testing circuit 202. Furthermore, testing circuit 202 need not match operating speed capabilities of the optical sensor to perform the testing. As depicted, testing results can be provided as an analytics output 218 by chip testing component 214, giving one or more operation metrics of an optical sensor under test.

As a specific illustrative example, consider a case where throttling component 110 subdivides a stream of serial data provided by serial converter 108 into n subsets, where n is a suitable integer greater than one. In these aspects, an output data rate transmitted by throttling component 210 to chip testing component 214 can have a ratio of 1/n to an input data rate (in the case of no discarded data; in aspects where some data received at testing circuit 202 is discarded, the ratio can be 1/(n−x) where x is a function of an amount of discarded data). In at least one aspect of the subject disclosure, a value of n can be selected at least in part based on a buffer capacity of testing circuit 202. In other aspects of the subject disclosure, the value of n can be selected at least in part based on a processing speed of chip testing component 214. In still other aspects, the value of n can be selected at least in part based on a data speed associated with data input 204 or an optical sensor chip connected thereto (e.g., a data path data speed, a pixel readout speed, . . . ). As another illustrative example, consider one example presented in FIG. 1, supra, for an optical sensor chip operating at 600 megahertz and chip testing component (e.g., chip testing component 214) or a testing circuit (e.g., testing circuit 202) that operates at 75 megahertz. In this case, n can be selected as a value of 600/75, or 8 (in aspects where testing circuit 202 does not discard data received from the optical sensor chip; otherwise, the value can be smaller than 8, as a function of an amount of discarded data). In at least one aspect, the value of n can also be modified (e.g., upward, downward) based at least in part on buffer capacity of testing circuit 202.

Figure 3:
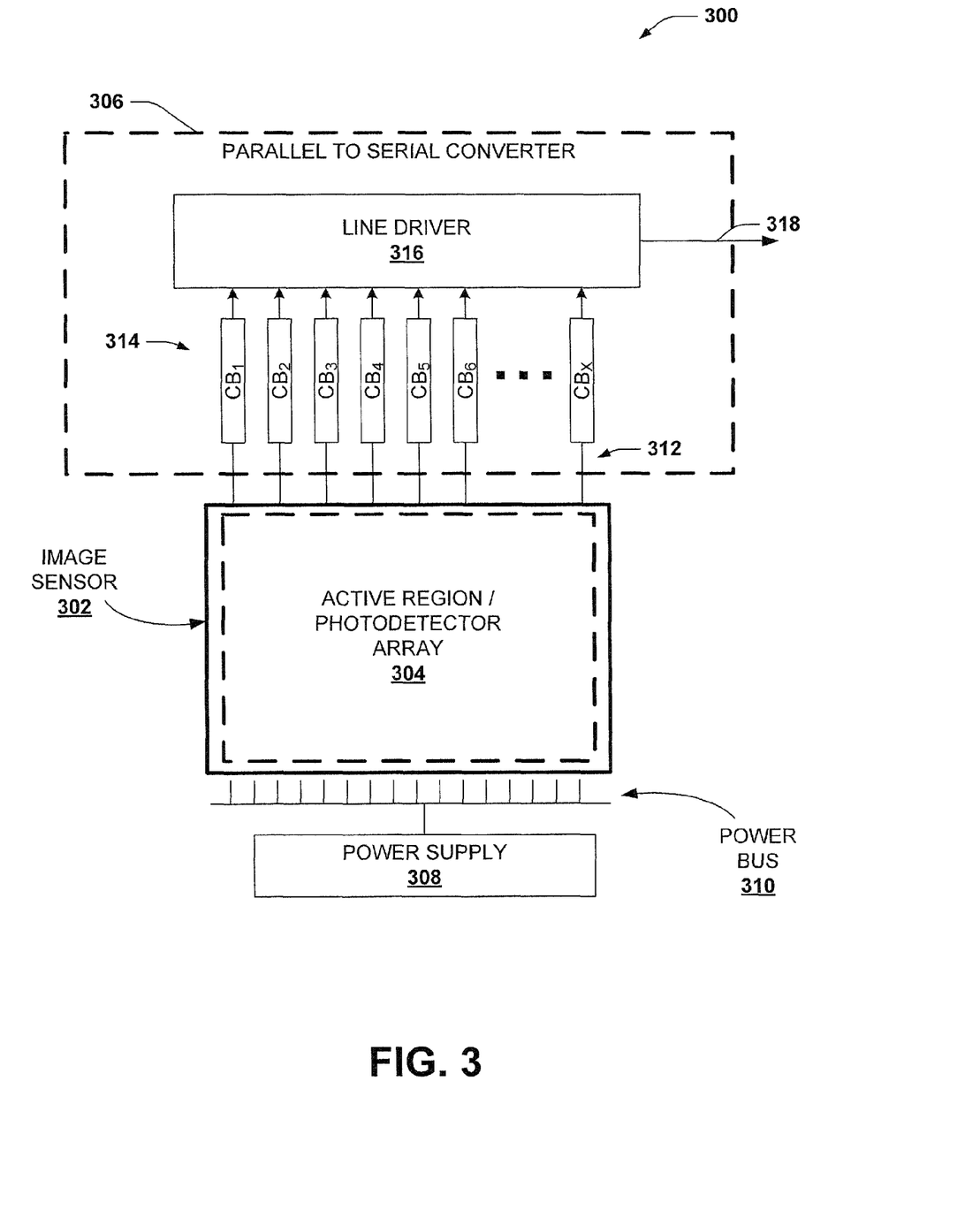
FIG. 3 illustrates a block diagram of an example system that facilitates reducing speed of serial data input to a testing circuit.

FIG. 3 depicts a block diagram of an example system 300 for serializing parallel data output by an optical sensor, according to particular aspects of the subject disclosure. System 300 can comprise an image sensor 302. Image sensor 302 can be configured to receive electromagnetic signals, and generate a set of electrical signals as a function of a characteristic(s) of the electromagnetic signals. The set of electrical signals can comprise a set of discrete voltages, currents, etc., or suitable combinations thereof, generated by respective photo-sensitive pixels of a photo-detector array 304 or associated electronic circuitry. Image sensor 302 and photo-detector array 304 are powered by a power supply 308 via a power bus 310, which can also power parallel to serial converter 306 in at least one disclosed aspect.

Electrical signals generated by photo-detector array 304 can be processed on a column-by-column basis. For outputting electrical signals from photo-detector array 304, a controller (not depicted) can select a particular row of pixels for a read operation. During a readout cycle, the controller can cause pixels of the selected row to output a signal to one of a set of read buses 312 connecting respective columns of pixels to parallel to serial converter 306. Particularly, respective buses of read buses 312 are configured to transfer an electrical signal(s) from a pixel(s) within associated respective columns of photo-detector array 304. When a single row is selected for read operation, a pixel within the row transfers an electrical signal to its associated one of read buses 312. Each pixel of the selected row can output such a signal, resulting in a number of signals equaling a number of pixels in the selected row, per readout cycle.

Each read bus 312 can carry content (e.g., sampled signals) from a pixel(s) of photo-detector array 304 to a respective column buffer 314, indicated as column buffers $CB_1$, $CB_2$, $CB_3$, . . . $CB_N$ (referred to collectively as column buffers 314). Column buffers 314 can amplify signals read out from pixels to read buses 312. Further, each respective column buffer 314 can condition a signal from a pixel positioned at one of the rows in the column (or columns) corresponding with the respective column buffer 314.

After processing by column buffers 314, output from respective column buffers 314 can be received by a line driver 316. Line driver 316 can be configured to multiplex signals received by column buffers 314 (or a subset thereof) onto a common readout path 318. Line driver 316 can be a source follower, for instance. Moreover, although not shown, it should be appreciated that parallel to serial converter 306 can comprise multiple line drivers similar to line driver 316, for sending subsets of signals output from respective subsets of column buffers 314 via common readout path 318. In this case, respective line drivers can multiplex respective subsets of signals processed by column buffers 314, and provide respective multiplexed signal outputs, which can be multiplexed onto common readout path 318. Common readout path 318 can facilitate sequential communication of respective signals from respective column buffers 314, thereby serializing the parallel output of image sensor 302. This serial output data can be processed as described herein, for example, by a testing circuit or the like. It should be appreciated that parallel to serial converter 306 provides one example of serializing a set of parallel signals, though others can be utilized instead.

Figure 4:
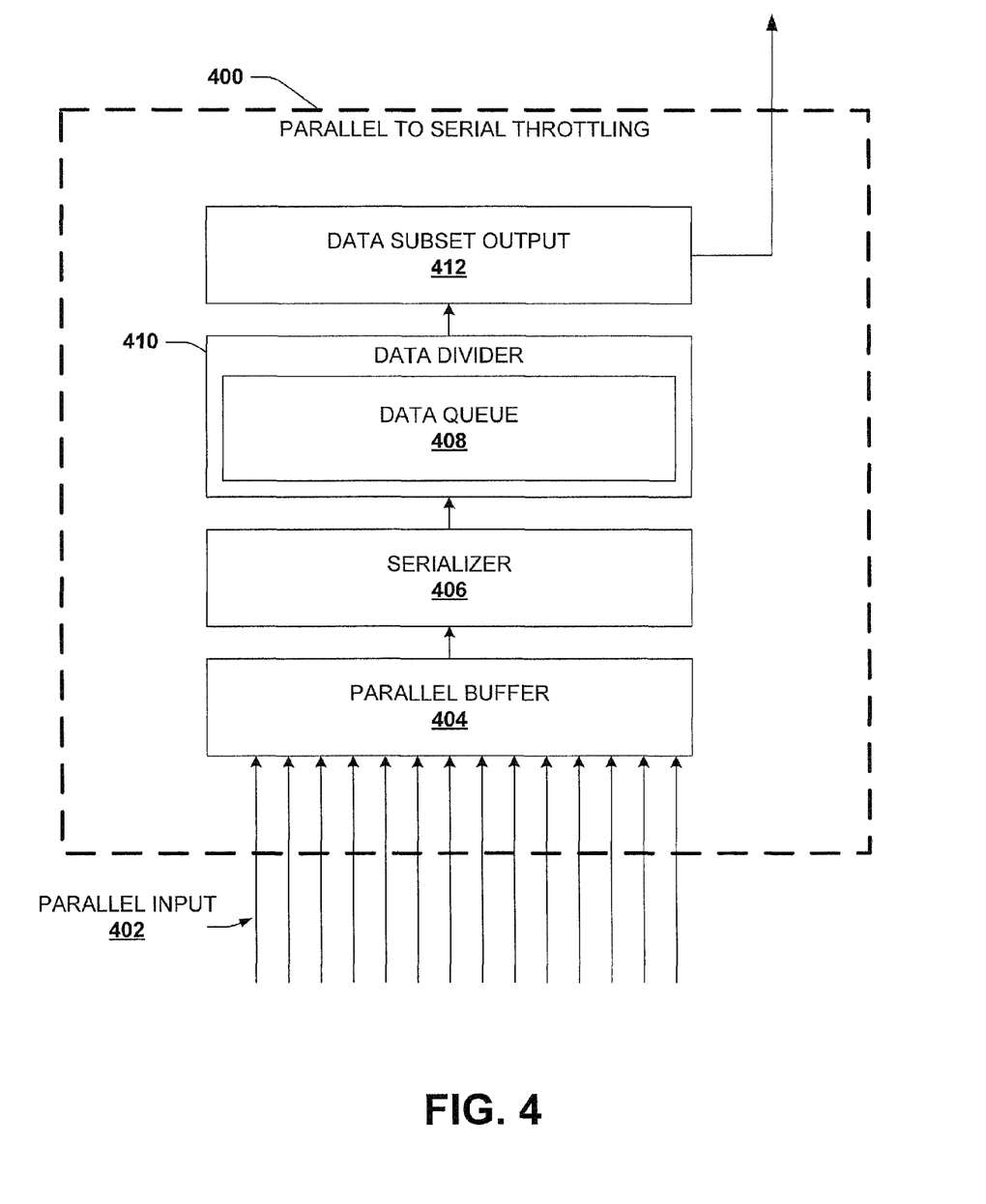
FIG. 4 depicts a block diagram of an example system that facilitates interoperation of a high speed data path with low speed data analytics.

FIG. 4 illustrates a block diagram of an example parallel to serial converter 400 comprising integrated data speed throttling according to one or more additional aspects of the subject disclosure. Parallel to serial converter can receive a set of data from a parallel data input 402, as depicted. Data received over parallel data input 402 can be stored in a parallel buffer 404, and provided to a serializer 406. Serializer 406 can be configured to convert parallel data to a stream of data units, such as a sequence of bits, a sequence of bytes, or the like. In one aspect of the subject disclosure, serializer 406 can comprise a set of column buffers and a line driver(s) as depicted in FIG. 3, supra. However, it should be appreciated that serializer 406 is not limited to this aspect.

The stream of data generated by serializer 406 can be provided to a data divider 410 in a data transfer frame (e.g., a clock cycle) of parallel to serial converter 400. Data divider 410 can be configured to subdivide data received within a given data transfer frame into 17 exclusive subsets of the data, where n is a positive integer greater than one. The n subsets of the data can be stored in a data queue 408 pending output of respective subsets by a data subset output 412 from parallel to serial converter 400. In some aspects of the subject disclosure, data subset output 412 can output one of the n subsets of data from data queue 408 per data transfer frame of parallel to serial converter 400. Thus, output of all n subsets of the data can require n data transfer frames, effectively reducing an output data speed from parallel to serial converter 400 by 1/n compared with an input data speed into parallel to serial converter 400. In alternative aspects of the subject disclosure, data subset output 412 can output a plurality, x, of the n subsets of data from data queue 408 per data transfer frame (e.g., where x equals two subsets, three subsets, . . . ). In the alternative aspects, parallel to serial converter 400 can effectively reduce the output data speed of parallel to serial converter 400 by 1/(n−x) as compared with the input data speed.

Figure 5:
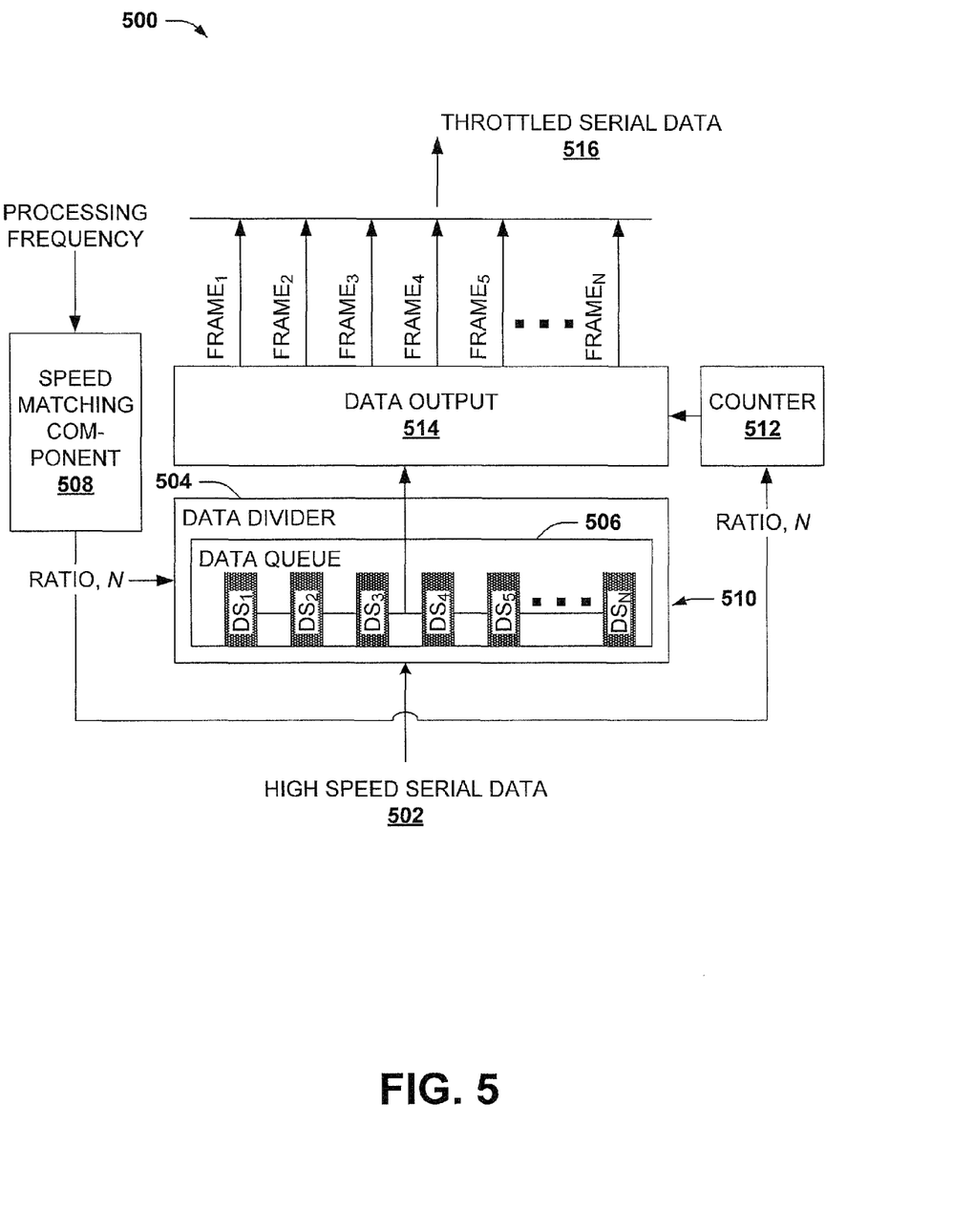
FIG. 5 illustrates a block diagram of a sample system that matches high speed sensor equipment with low speed testing equipment.

FIG. 5 illustrates a block diagram of an example system 500 for reducing an input data speed of received data, according to still other aspects of the subject disclosure. In a particular aspect, system 500 can be implemented in conjunction with system 400 of FIG. 4, supra. However, the subject disclosure is not limited to this particular aspect, and system 500 can be implemented independently of system 400, or in conjunction with other embodiments disclosed herein.

System 500 can comprise a high speed serial data input 502 providing a sequence of data to a data divider 504 at a high data rate (e.g., a data rate of Z, 600 megahertz rate, or other suitable data rate). Data divider 504 can comprise a data queue 506 for storing respective subsets of data received from high speed serial data input 502. A speed matching component 508 can obtain a processing frequency of an optical sensor testing component (not depicted, but see FIGS. 1 and 2, supra, for example) and employ the processing frequency for calculating a divider ratio n. The divider ratio n is provided to data divider 504 for determining a number of subdivisions of the data to generate. The divider ratio n can also be provided to a counter 512 for controlling output of respective subsets of the data from system 500, as is described in more detail below.

Data divider subdivides a set of received data into n subsets, which can be stored separately at data queue 506 in respective data buffers 510 of data queue 506. Data buffers 510 can comprise separate memory addresses of a single memory device, or separate memory devices, or a suitable combination thereof in various aspects of the subject disclosure. A data output 514 is controlled by counter 512 to extract and output one or more subsets of data stored in respective one or more data buffers 510 per output frame (e.g., a clock cycle, . . . ) of system 500. Counter 512 can be configured to initialize a frame counter to n frames (or a fraction thereof, in the event of outputting multiple data subsets per output frame), beginning at a first output frame. Upon each successive output frame, counter 512 can increment the frame counter, causing data output 514 to extract and output data from a subsequent data buffer (or set of data buffers). Thus, as an example, where a single data buffer is output per output frame, data output 514 extracts data stored in a first of data buffers 510 in a first output frame, data stored in a second of data buffers 510 in a second output frame, . . . , and data stored in an $n^{th}$ of data buffers 510 in an $n^{th}$ output frame. The sequential output of one or more respective data buffers 510 in sequential frames results in a throttled stream of serial data 516, having a data output rate that is a fraction of the high speed serial data input 502.

The aforementioned diagrams have been described with respect to interaction between several systems, apparatuses, components, electronic circuits, or photo-detector arrays. It should be appreciated that such diagrams can include those components or systems specified therein, some of the specified components, or additional components. For example, a system could include system 300 in conjunction with system 500 and chip testing component 112. Sub-components could also be implemented as components electrically connected to other sub-components rather than included within a parent system. Additionally, it should be noted that two or more components could be combined into a single component providing aggregate functionality. For instance, parallel buffer 404 can include serializer 406 to facilitate receiving a set of parallel input data and serializing the parallel input data, by way of a single component. Components of the disclosed systems and apparatuses can also interact with one or more other components not specifically described herein but known by those of skill in the art, or made known to one of skill in the art by way of the context provided herein.

Figure 6:
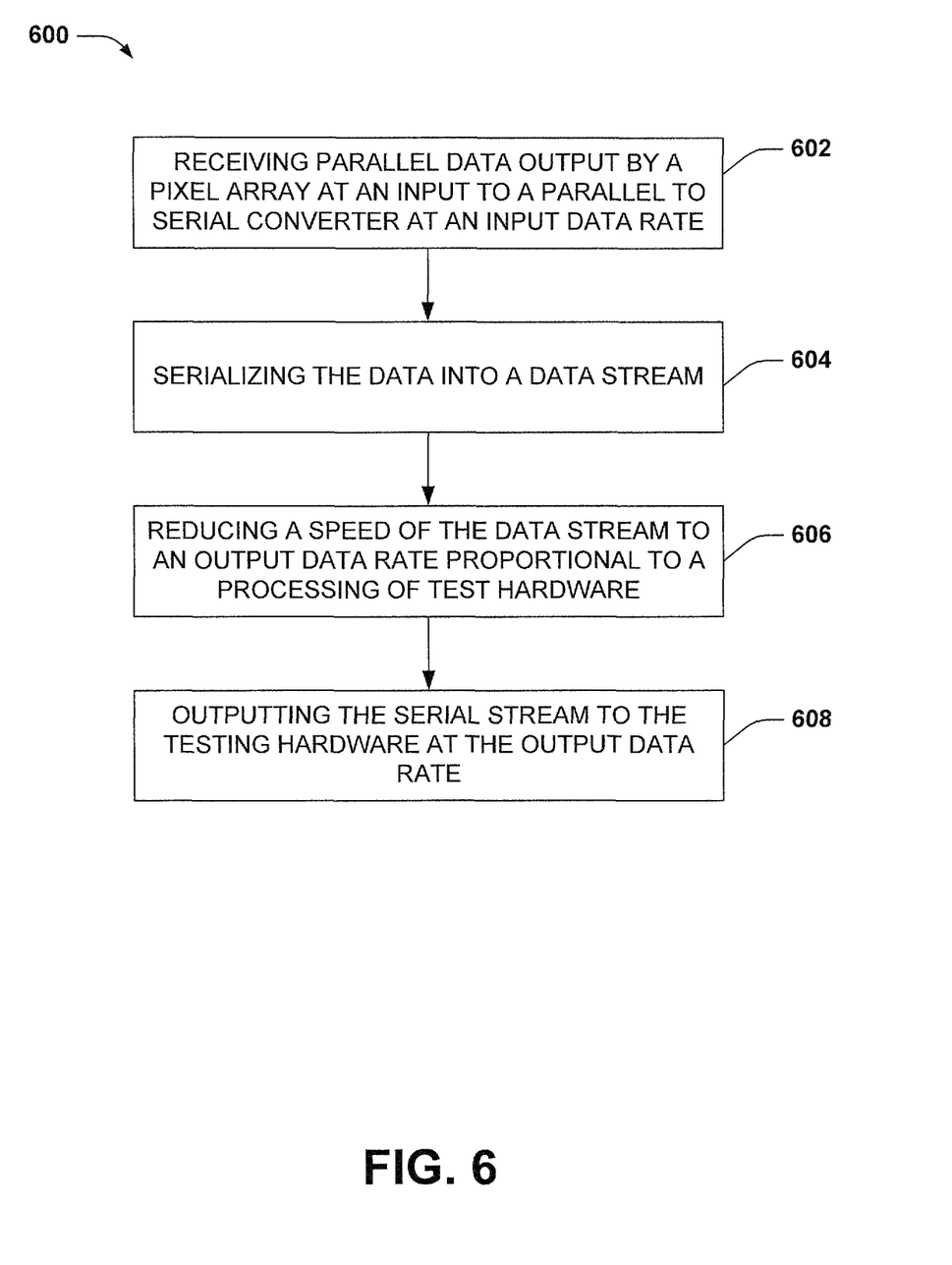
FIG. 6 depicts a flowchart of a sample method for providing low speed testing of high speed sensor equipment, in one or more aspects.
Figure 7:
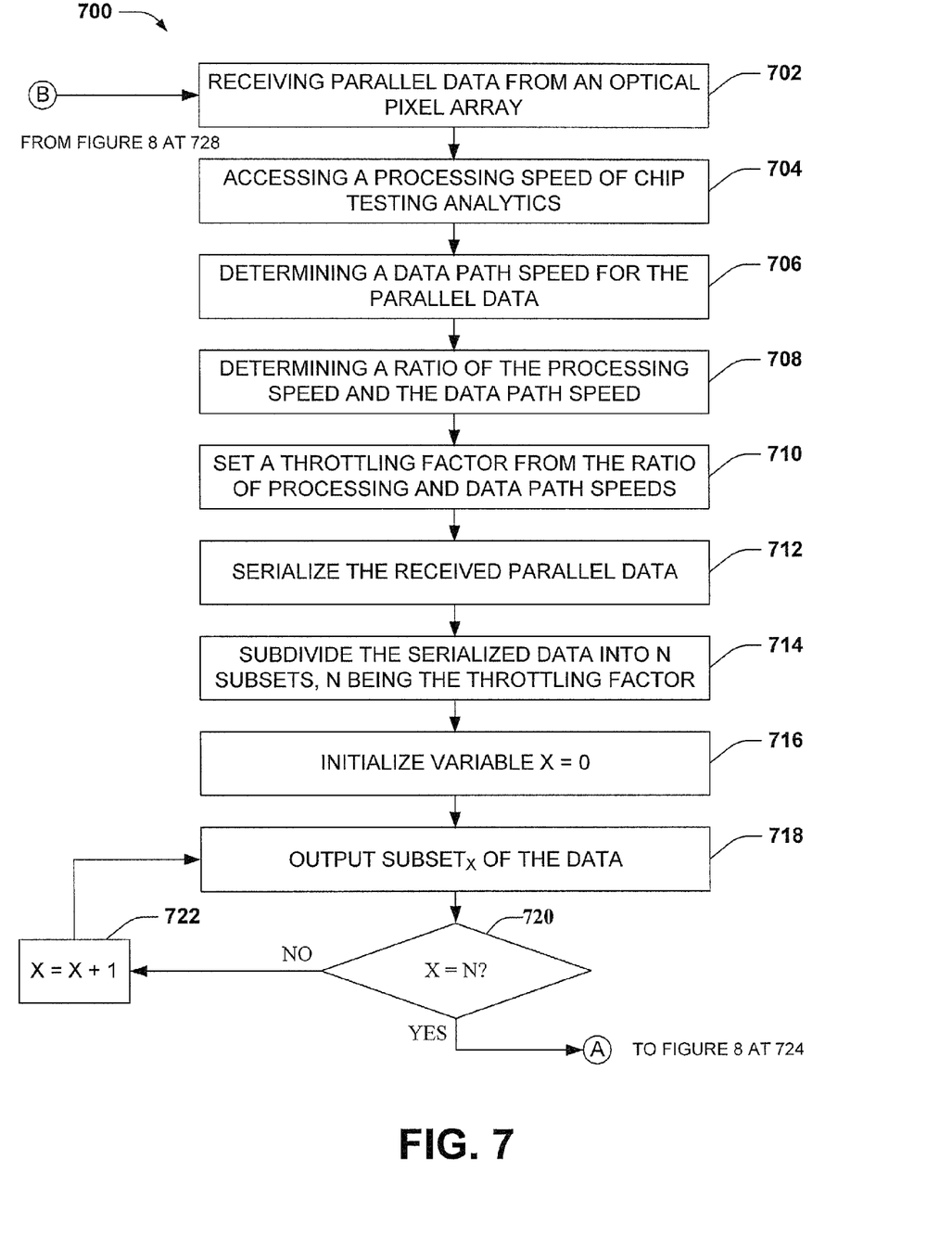
FIGS. 7 and 8 illustrate a flowchart of an example method for speed matching a data output path with an input test processor, in other aspects.
Figure 8:
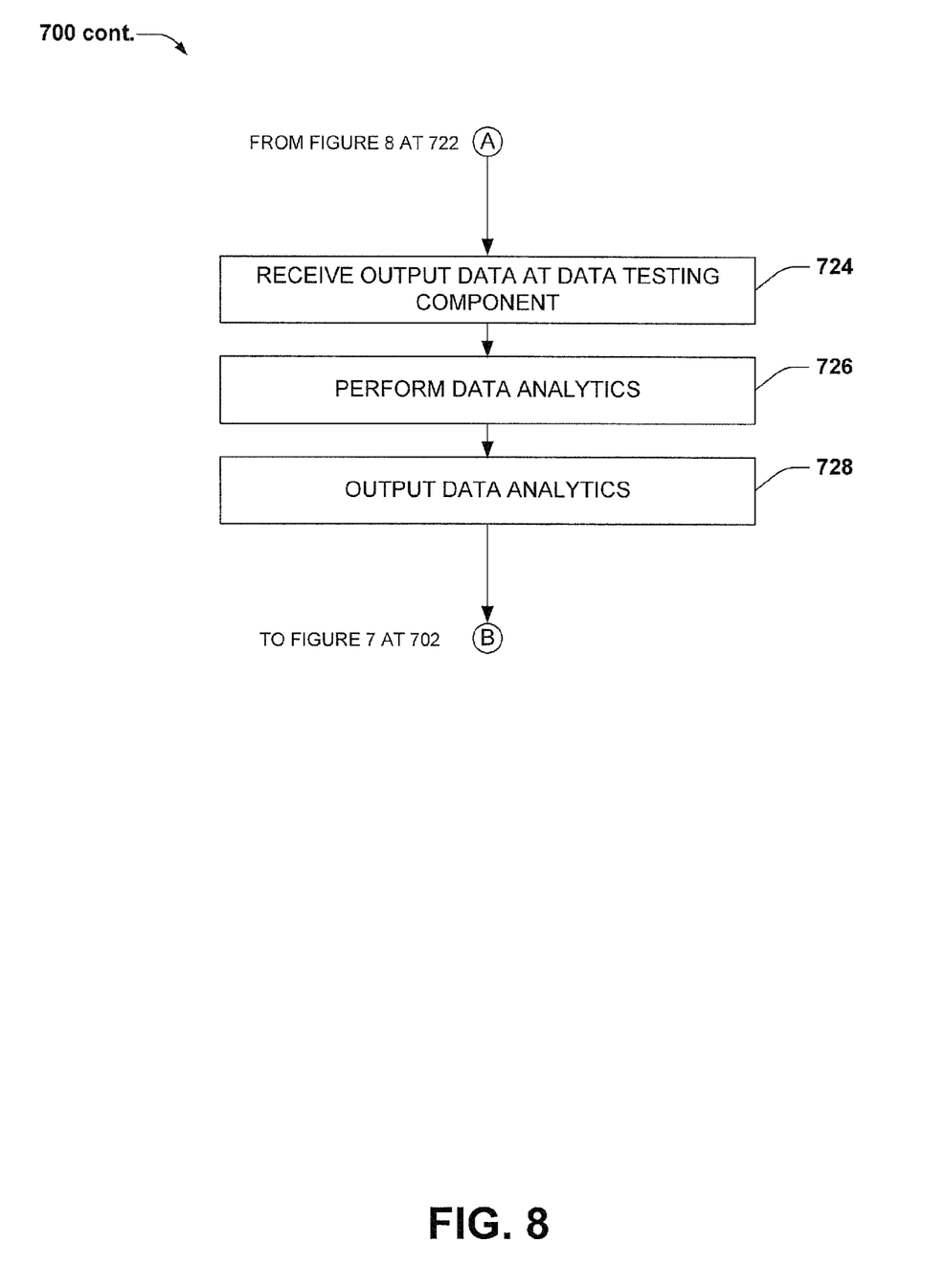

In view of the exemplary diagrams described supra, process methods that may be implemented in accordance with the disclosed subject matter will be better appreciated with reference to the flow charts of FIGS. 6-8. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter. Additionally, it should be further appreciated that the methods disclosed hereinafter and throughout this specification are capable of being stored on an article of manufacture to facilitate transporting and transferring such methods to an electronic device. The term article of manufacture, as used, is intended to encompass a computer program accessible from any computer-readable device, device in conjunction with a carrier, or storage medium.

FIG. 6 illustrates a flowchart of an example method 600 for reducing a data rate of received data, according to one or more aspects of the subject disclosure. At 602, method 600 can comprise receiving a set of parallel input data at an input data rate (e.g., 600 megahertz, . . . ). The parallel input data can be output by an optical pixel array. Moreover, the set of parallel input data can be received at an input to a parallel to serial converter. At 604, method 600 can comprise serializing the data into a data stream. The serialized data stream can be transmitted at a rate substantially equivalent to the input data rate. At 606, method 600 can comprise reducing a speed of the data stream to an output data rate that is a fraction of the input data rate. In at least one aspect, the fraction can be proportional to a processing characteristic(s) of a testing hardware. In alternative or additional aspects, the fraction can be a function at least in part of available buffer memory for buffering the serial stream of data. In still other aspects, the fraction can be at least in part a function of a ratio of data discarded by the parallel to serial converter to the data received by the parallel to serial converter. At 608, method 600 can comprise outputting the data stream from the parallel to serial data converter to the testing hardware at the output data rate.

FIGS. 7 and 8 illustrates a flowchart of a sample method 700 for matching an optical sensor with a wafer test component having differing operational frequencies, according to particular aspects of the subject disclosure. At 702, method 700 can comprise receiving parallel input data from an optical pixel array. At 704, method 700 can comprise accessing a processing speed of the wafer test component, or of analytic functions of the wafer test component. At 706, method 700 can comprise determining a data path speed for the parallel data. At 708, method 700 can comprise determining a ratio of the processing speed and the data path speed.

At 710, method 700 can comprise setting a throttling factor from a function of the processing speed and the data path speed. At 712, method 700 can comprise serializing the received parallel data. At 714, method 700 can comprise subdividing the serialized data into n subsets of data, where n is a value equal to the throttling factor.

At 716, method 700 can comprise initializing a variable x=0. At 718, method 700 can comprise outputting subset$_x$ of the serialized data. At 720, a determination can be made as to whether x=n. If not, method 700 can proceed to 722; otherwise, method 700 proceeds to 724 at FIG. 8, infra. At 722, method 700 can comprise incrementing a value of the variable x by setting x=x+1. From 722, method 700 can return to reference number 718, to output subset, of the serialized data. As depicted, reference numbers 718, 720 and 722 form a loop for outputting each of the subsets of the serialized data.

Turning now to FIG. 8, method 700 can continue at 724, where method 700 can comprise receiving output data at a data testing component. At 726, method 700 can comprise performing data analytics on the received output data. At 728, method 700 can comprise outputting a result of the data analytics. From 728, method 700 can terminate, in one aspect of the subject disclosure, or can return to reference number 702 of FIG. 7, in another aspect.

Figure 9:
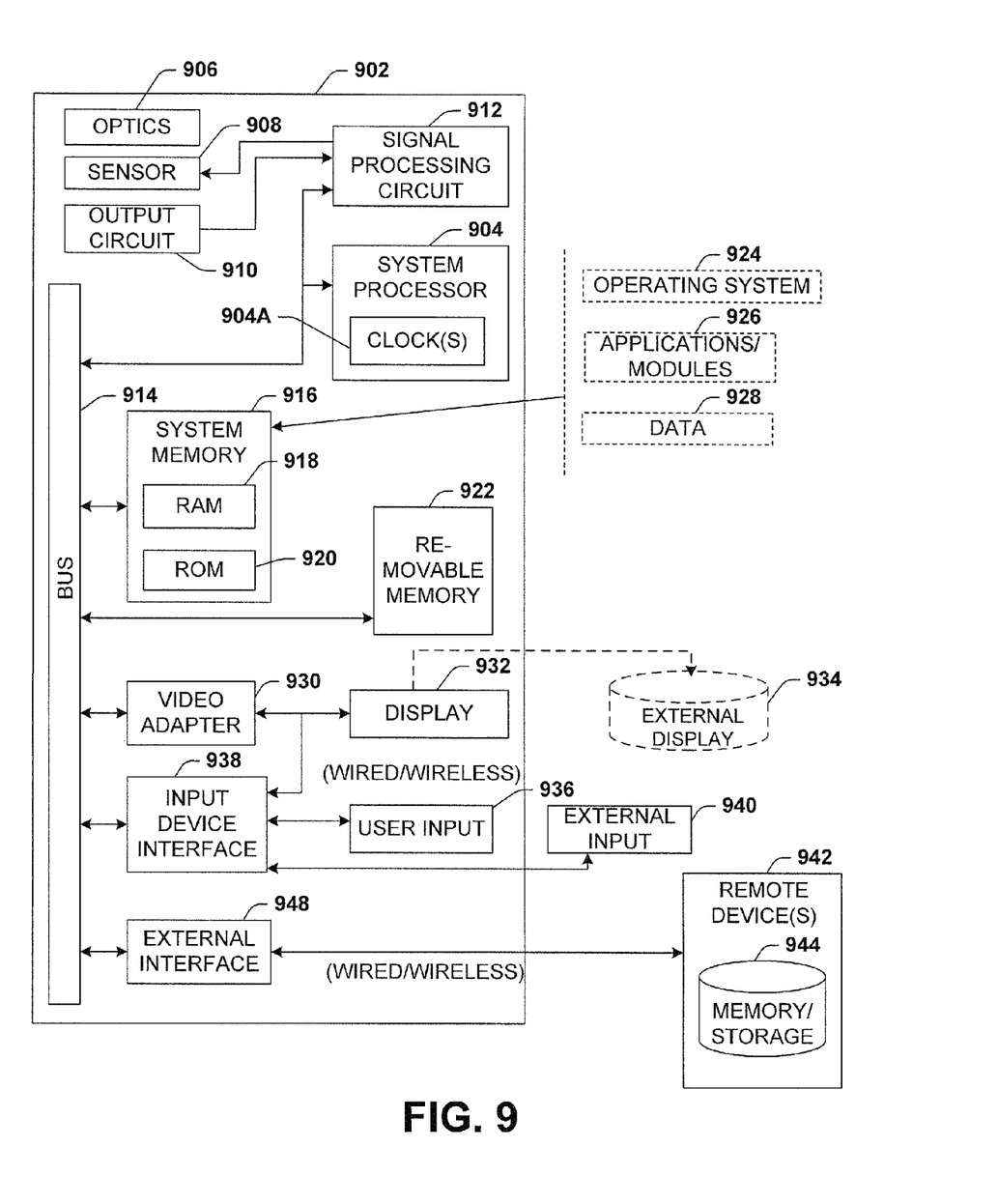
FIG. 9 illustrates a block diagram of an example electronic device comprising a camera module that can be utilized with disclosed aspects.

Referring now to FIG. 9, there is illustrated a block diagram of an exemplary digital camera system operable to execute one or more aspects of the disclosed architecture. In order to provide additional context for various aspects of the disclosed embodiments, FIG. 9 and the following discussion are intended to provide a brief, general description of a suitable electronic computing environment 900 in which the various aspects of the disclosed embodiments can be implemented. Additionally, while the disclosed embodiments described above may be suitable for application in the general context of instructions that may run or be executed in conjunction with an electronic device, those skilled in the art will recognize that the disclosed embodiments also can be implemented in combination with other program modules and/or as a combination of hardware and software.

Generally, program modules include routines, programs, components, data structures, etc., that perform particular tasks associated with electronic computing environment 900. Moreover, those skilled in the art will appreciate that the disclosed methods can be practiced with other electronic system configurations, including hand-held computing devices, microprocessor-based or programmable consumer electronics, single-processor or multiprocessor state machines, minicomputers, as well as personal computers, and the like, each of which can be operatively or communicatively coupled to one or more associated devices.

The illustrated aspects of the various embodiments can also be practiced in distributed computing environments where certain tasks are performed by remote processing devices that are linked through a wired or wireless communications network. In a distributed computing environment, program modules can be located in both local and remote memory storage devices.

An electronic processing device typically includes a variety of computer-readable media. Computer-readable media can be any available media that can be accessed by an electronic processing device and includes both volatile and nonvolatile media, removable and non-removable media. By way of example, and not limitation, computer-readable media can comprise non-transitory computer media (e.g., computer storage media, . . . ) and transitory communication media (e.g., signals, . . . ). Non-transitory computer media can include volatile and nonvolatile, removable and non-removable media implemented in any suitable method or technology for storage of information such as computer-readable instructions, data structures, program modules or other data. Non-transitory computer media includes, but is not limited to, RAM, ROM, EEPROM, flash memory or other memory technology, or any other medium which can be used to store information and which can be accessed by an electronic processing device.

Continuing to reference FIG. 9, the exemplary electronic processing environment 900 for implementing various aspects of one or more of the disclosed embodiments includes a digital camera 902, the digital camera 902 including a system processor 904, optics 906, an image sensor 908, an output circuit 910, a signal processing circuit 912, a system memory 916 and a system bus 914. The system bus 914 couples to system components including, but not limited to, the system memory 916 to the system processor 904. The system processor 904 can be a suitable semiconductor processing device manufactured for digital camera 902, or any of various commercially available processors. Dual microprocessors and other multi-processor architectures may also be employed as the system processor 904.

Optics 906 can comprise one or more lens elements comprised of refractive material, reflecting material, scattering material or absorbing material, or a suitable combination thereof. The refractive material can be suitable to refract electromagnetic radiation, particularly in the visible spectrum, but also the near infrared or ultraviolet spectra, or other suitable spectra. Particularly, optics 906 can be configured to project and focus an image of an object onto image sensor 908. Optics can also be configured with an actuator (not depicted) to mechanically adjust optics 906 to focus objects at varying distances from digital camera 902.

Image sensor 908 can comprise any of various sensors for receiving electromagnetic radiation and generating electric signals proportionate to a magnitude(s) of the electromagnetic radiation. For instance, image sensor 908 can comprise a video tube, a charge-coupled device, or a CMOS device, or the like, or an array of such devices. In a particular example, image sensor 908 can comprise an array of photo-detectors as described herein (e.g., photo-detector array 304). Electric signals generated by image sensor 908 can be transferred to output circuit 910, in response to a clock signal generated by an electronic clock(s) 904A managed by system processor 904. The electric signals can then be output to signal processing circuit 912 for image processing.

Signal processing circuit 912 can be any suitable hardware or software processing entity, including an integrated circuit(s), an application specific integrated circuit(s) (ASIC), a state machine, or other suitable signal processing device. Signal processing circuit 912 can be configured to perform operations on electric signals provided by output circuit 910. These operations can include correlated double sampling, gamma processing, analog to digital conversion, digital to analog conversion, gain adjustment, interpolation, compression, or a combination thereof or of the like, to generate digital data to be adapted for presentation on an electronic display 932 of digital camera 902. Additionally, signal processing circuit 912 can store the digital data in system memory 916 before, during and after the operations.

The system bus 914 can be any of several types of bus structure suitable for communicatively connecting components of digital camera 902. System bus 914 can further interconnect to a memory bus (with or without a memory controller), a peripheral bus, and a local bus using any of a variety of commercially available bus architectures. The system memory 916 can include read-only memory (ROM) 920 or random access memory (RAM) 918. A basic input/output system (BIOS) for digital camera 902 can be stored in a non-volatile memory 920 such as ROM, EPROM, EEPROM, . . . , which BIOS contains the basic routines that help to transfer information between elements within the digital camera 902, when powered on for instance. The RAM 918 can also include a high-speed RAM such as static RAM, resistive RAM, or others, for caching data. Furthermore, digital camera can include removable memory 922, which can include any suitable non-volatile memory (e.g., Flash memory), or other removable memory technology.

A number of program modules can be stored in the system memory 916, including an operating system 924, one or more application programs or program modules 926 and program data 928. All or portions of the operating system, applications, modules, and/or data can also be cached in the RAM 918 It is appreciated that the various embodiments can be implemented with various commercially available or proprietary operating systems or combinations of operating systems.

A display 932 is also connected to the system bus 914 via an interface, such as a video adapter 930. Display 932 can comprise a flat panel display, such as a liquid crystal display, a light-emitting diode display, or the like. System processor 904 can control output of image data to present a digital replica of the image received by image sensor 908 on display

932. In addition, digital camera 902 can output the image data to an external display 934 via a suitable external interface 948.

A user can enter commands and information into the digital camera 902 through one or more input devices, e.g., touch screen manipulation, buttons, switches, dials, levers, etc. For instance, zoom functionality is often implemented by pressing a button, dial, lever, etc., in one direction to zoom in, or another direction to zoom out. Further, display options, selection of images, and similar display commands can be input via a touch screen, often implemented as part of display 932. Other input devices (not shown) may include a microphone, an IR remote control, a joystick, a game pad, a stylus pen, or the like. These and other input devices are often connected to the system processor 904 through an input device interface 938 that is coupled to the system bus 914, but can be connected by other interfaces, such as a parallel port, an IEEE1394 serial port, a game port, a USB port, an IR interface, a Bluetooth interface, etc.

The external interface 948 can include at least one or both of Universal Serial Bus (USB) and IEEE1394 interface technologies. Other external connection technologies are within contemplation of the subject matter disclosed herein. Moreover, external interface 948 can include a wireless technology, such as a Wi-Fi communication technology, Bluetooth™ technology, infrared (IR) technology, near field communication (NFC) technology, cellular technology, or the like. In addition to an external display, external interface 948 can facilitate communicatively coupling digital camera 902 to one or more remote devices 942. Remote device(s) 942 can include a computer, a display, a memory or storage device 944, and so on. Moreover, commands can be given to digital camera 902 from remote device(s) 942 over external interface 948 to system processor 904. This can facilitate remote control of digital camera 902, for remote camera operation (e.g., taking pictures, adding or deleting pictures from system memory 916, etc.), transferring data, such as stored digital images, updating operation system 924, applications/program modules 926, or data 928, and so on.

The digital camera 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth wireless technologies. Thus, the communication can be a predefined structure as with a conventional network or simply an ad hoc communication between at least two devices.

Wi-Fi allows connection to the Internet from various locations within range of a Wi-Fi access point, without wires. Wi-Fi is a wireless technology similar to that used in a cell phone that enables such devices, e.g., computers, to send and receive data indoors and out; within the range of the access point. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, as well as other rates (e.g., 802.11g, 802.11n, . . . ) or with products that contain both bands (dual band), so the networks can provide real-world performance similar to the basic 10BaseT wired Ethernet networks used in many offices.

What has been described above includes examples of the disclosed embodiments. It is, of course, not possible to describe every conceivable combination of components or methods for purposes of describing the embodiments, but one of ordinary skill in the art may recognize that many further combinations and permutations are possible. Accordingly, the detailed description is intended to embrace all such alterations, modifications, and variations that fall within the spirit and scope of the subject disclosure, including such alterations, modifications and variations that might be intuited by one of ordinary skill in the art by way of the context presented herein.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts or events of the various methods.

As used in this application and the appended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for data readout from an electronic image sensor, comprising:
   a serial data interface for receiving a set of bits in a first data output frame from a pixel array of the electronic image sensor and converting the set of bits into a sequential stream of bits; and
   a throttling component that facilitates outputting respective subsets of the received set of bits in respective ones of a plurality of data output frames for conversion to the sequential stream of bits,
   the subsets of the received set of bits comprises a first subset that includes every $n^{th}$ bit of the stream of bits, where n is a non-negative integer.

2. The system of claim 1, the throttling component further facilitates buffering and processing the sequential stream of bits.

3. The system of claim 1, the throttling component outputs the first subset of the received set of bits in the first data output frame, and outputs a second subset of the received set of bits that is exclusive of the first subset of the received bits during a second data output frame.

4. The system of claim 1, the throttling component outputs n respective subsets of the received bits over n data output frames, and outputs each bit of the set of received bits after an $n^{th}$ data output frame.

5. The system of claim 1, further comprising a wafer test component that receives and analyzes the subset of the bits to test functionality of the electronic image sensor.

6. The system of claim 5, the wafer test component comprises a set of statistical engines configured to perform respective tests with the subset of the bits.

7. The system of claim 6, the set of statistical engines comprises a heuristic engine, a consistency engine, or a data output performance engine.

8. The system of claim 1, the throttling component operates the pixel array substantially at a full clock speed capability of the pixel array.

9. The system of claim 1, the throttling component operates a data path of the pixel array or the serial data interface substantially at a full clock speed capability.

10. The system of claim 1, the throttling component outputs the set of bits from the serial data interface at a fraction of a clock speed for which the set of bits are input to the serial data interface.

11. The system of claim 10, the fraction is 1 divided by n, where n is a number of data output frames, comprising the first data output frame, over which all bits of the stream of bits are output by the throttling component.

12. The system of claim 10, the fraction of the clock speed substantially matches a processing speed of a wafer test component of the system.

13. The system of claim 10, the throttling component is configured to:
obtain a processing speed of a wafer test component connected to the system; and
select a value of the fraction that substantially matches the fraction of the clock speed with the processing speed.

14. The system of claim 10, the clock speed for the data path is substantially six hundred megahertz or greater.

15. A method of reading data from an image sensor, comprising:
receiving data output by a pixel array of the image sensor at an input to a serial data converter at an input data rate;
serializing the data into a data stream;
reducing a speed of the data stream to an output data rate that is a fraction of the input data rate and is proportional to a processing characteristic of a testing hardware; and
outputting the data stream from the serial data converter to the testing hardware at the output data rate.

16. The method of claim 15, wherein reducing the speed of the data stream further comprises generating a number of subsets of the stream of data and iteratively outputting respective ones of the number of subsets from the serial data converter.

17. The method of claim 16, further comprising selecting the number from a ratio of the input data rate and a processing speed of the testing hardware.

18. The method of claim 15, further comprising:
operating a pixel readout path of the image sensor and a data path of the serial converter at a full speed capacity; and
operating the testing hardware at a fraction of the full speed capacity concurrent with operating the pixel readout path and the data path at the full speed capacity.

19. An apparatus that tests operation of an image sensor, comprising:
a serial interface for receiving data from the image sensor and converting the data to serial data;
a testing circuit configured to implement a set of data analytics for the serial data;
a speed matching component configured to determine a ratio of processing speed of the testing circuit and data speed of an output data path of the image sensor; and
a throttling component configured to reduce an output speed of the serial data from the serial interface by about the ratio of processing speed and data speed.

20. The apparatus of claim 19, further comprising:
a divider circuit that subdivides the serial data into a number of respective subsets of the serial data equal to the ratio of processing speed and data speed; and
a tracking circuit that counts output of the respective subsets of the serial data and directs iterative output of the respective subsets of the serial data in conjunction with incrementing the counts, and that resets the counts upon directing output of a final one of the subsets of the serial data in preparation for output of additional data received at the serial interface.

* * * * *